United States Patent [19]

Gabbey

[11] 3,727,904
[45] Apr. 17, 1973

[54] CONCENTRICITY COIL FOR SCREW THREADS

[76] Inventor: Eric G. Gabbey, P.O. Box 43271, Los Angeles, Calif. 90043

[22] Filed: Mar. 12, 1971

[21] Appl. No.: 123,911

Related U.S. Application Data

[63] Continuation of Ser. No. 773,529, Nov. 5, 1968, abandoned.

[52] U.S. Cl. ...................269/52, 85/1 R, 269/287, 85/32 CS
[51] Int. Cl. ..............................................B23q 3/06
[58] Field of Search..............................269/52, 287; 85/32 CS

[56] References Cited

UNITED STATES PATENTS 1,189,081   6/1916   Fitzgerald......................151/14 CS
2,022,946   12/1935   Staempfli........................151/14 CS
3,494,018   2/1970   Helderman et al....................85/10 E
3,172,123   3/1965   Helderman et al.....................227/11

FOREIGN PATENTS OR APPLICATIONS 731,394   6/1955   Great Britain......................85/32 CS Primary Examiner—Edward C. Allen
Attorney—Donald Diamond

[57] ABSTRACT

A coil of wire is provided which can be placed on the screw thread of a bolt or nut in order to provide a surface for holding the bolt or nut in the jaws of a chuck or the like. This permits the fastener to be held in a chuck on a known surface which assures concentricity with the axis of the pitch diameter and in a manner which eliminates damaging the threads.

1 Claim, 7 Drawing Figures

PATENTED APR 17 1973 3,727,904

ERIC G. GABBEY
INVENTOR.

BY Knight & Rodgers
ATTORNEYS

CONCENTRICITY COIL FOR SCREW THREADS

This is a continuation of Ser. No. 773,529, filed Nov. 5, 1968, and now abandoned.

Background of the Invention

The present invention relates generally to fasteners and more particularly to fasteners with screw threads of various types, such as V-shapes, buttress, Acme and so on.

When holding a screw-threaded member, for example a bolt, in a multiple-jaw chuck, it has been common practice to grip the thread on the major or outside diameter. This was done since it is convenient and easily done. It would be preferable, but it has heretofore been very difficult, to grip the thread along the line of the pitch diameter because this line is below the major diameter or the diameter of the crest of the threads and consequently is inaccessible to the jaws of a chuck or the like.

This common practice is unsatisfactory for at least two reasons. In the first place, the threads very often suffer obvious damage since the crests of the threads are deformed by the force applied to them by the chuck jaws.

Furthermore, the major diameter of the threads is not always concentric with the pitch diameter; and it is actually the pitch diameter with respect to which the fastener should be held since any machine operations should be accurately performed relative to the true axis of the thread, that is with respect to the axis of the pitch diameter.

In the past, this problem has not been of serious consequence because of the relatively large tolerances to which threads and fasteners were made and the substantial factors of safety involved. However, with modern bolts made from high strength materials, the manufacturing tolerances have been greatly decreased, that is, a much higher degree of accuracy is now required in the fabrication of these fasteners. Furthermore, the factor of safety in these fasteners has been reduced so that it now becomes necessary to stress the fasteners uniformly in order to develop safely the full strength of the fastener; and this requires that all specifications regarding dimensions and angles be rigidly adhered to in the manufacture of such devices.

Thus, it becomes a general object of the present invention to provide means for gripping a bolt or a nut accurately with respect to the pitch diameter and the axis of the pitch diameter, without damage to the threads, when it is desired to grip the fastener in a chuck or the like for any type of inspection, finishing, or machining operation.

SUMMARY OF THE INVENTION

The object of the invention is achieved by combining with a screw-threaded fastener element a helical coil of wire so that when turns of the coil lie between successive turns of the thread on the fastener, the turns of the coil extending outwardly of and beyond the thread to provide a surface which can be engaged by the jaws of a chuck or the like. The turns of the thread typically have inclined flanks, and the turns of the concentricity coil engage the threads on their flanks substantially at the pitch diameter of the thread. The coil is made from round wire of a selected diameter to effect this relationship.

While the present invention finds a particular application in the case of bolts and similar features with an external thread, it can also be applied to nuts or other devices having an internal thread.

BRIEF DESCRIPTION OF THE DRAWING

How the above objects and advantages of the present invention, as well as others not specifically mentioned, are achieved will be more readily understood by reference to the following description and to the annexed drawing, in which.

DESCRIPTION OF A PREFERRED EMBODIMENT

Figure 1:
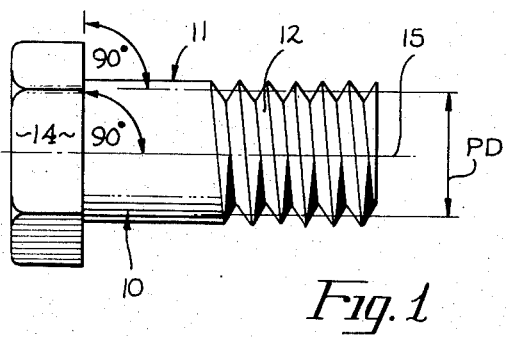
FIG. 1 is a side elevation of a typical bolt having a threaded shank.

FIG. 1 illustrates a common type of bolt indicated generally at 10 and having a shank 11 which is threaded at 12 with a typical screw thread of a V-shape. At one end of the shank is head 14 to which a wrench or other tool may be applied for the purpose of turning the bolt.

Thread 12 is illustrated (FIG. 7) as having an angle of 60° between the flanks of two adjoining turns of the threads, but it will be understood that the invention is not necessarily limited to any particular angle since it may be applied to any one of various known V-shaped threads. The pitch diameter of the thread is indicated at P.D., this diameter of the thread having an axis 15.

Figure 2:
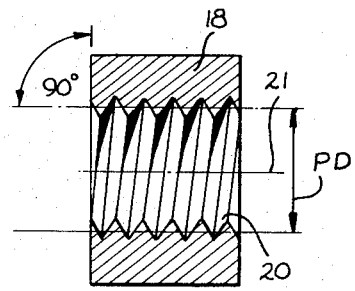
FIG. 2 is an axial longitudinal section through a typical nut having an internal thread.

Bolt 10 is commonly combined with nut 18 shown in FIG. 2 which is provided with an internal thread 20 having an equal pitch diameter P.D. concentric about axis 21 of the nut. It is common practice to specify that the under surface of bolt head 14 or the end faces of nut 18 must be exactly 90° with respect to axes 15 and 21, respectively; and it will be obvious from the geometry of the threads that these surfaces on the bolt head and nut are then likewise exactly 90° with respect to a cylindrical surface having a diameter equal to the pitch diameter of the thread and concentric with respect to these axes. This requirement that said surfaces be exactly normal to the thread axis is imposed to avoid any eccentric loading on the bolt shank after it is tightened and thereby avoid any localized concentration of tensile stresses in the shank.

Figure 3:
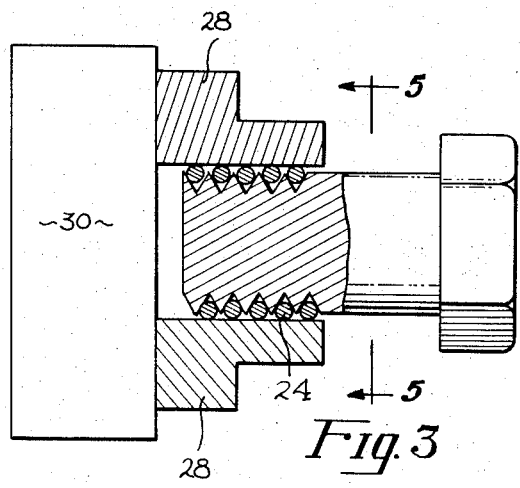
FIG. 3 is a combined elevation and section showing a threaded bolt with a concentricity coil applied thereto and gripped in the jaws of a chuck.
Figures 4, 5:
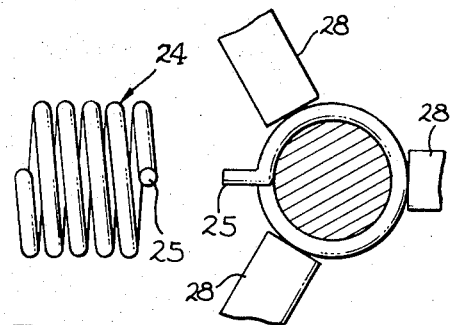
FIG. 4 is a side elevation of a concentricity coil along.
FIG. 5 is a fragmentary transverse section on line 5—5 of FIG. 3 illustrating the jaws of a chuck gripping the concentricity coil.
Figure 6:
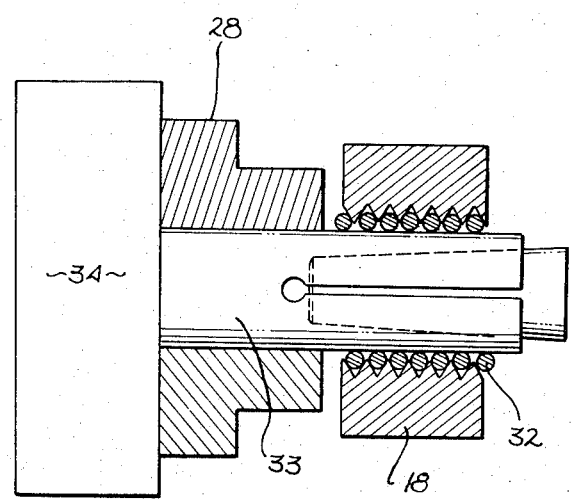
FIG. 6 is a view similar to FIG. 3 showing the application of the concentricity coil to an internal thread.
Figure 7:
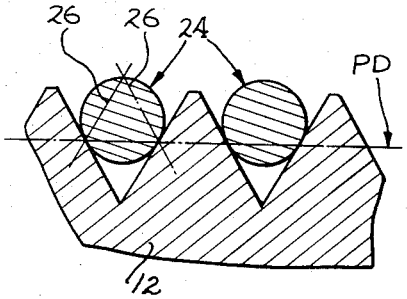
FIG. 7 is an enlarged fragmentary section of a thread with a concentricity coil applied to it.

A typical concentricity coil 24 is illustrated in FIG. 4. It comprises a plurality of helical turns of a round wire, the diameter of the turns and the axial spacing between them being such that they can be placed between successive turns of thread 12 with the turns of the coil extending outwardly beyond the crests of the thread when coil 24 is screwed onto the thread as illustrated in FIGS. 3 and 7. The mean diameter of the turns of coil 24 is slightly greater than the pitch diameter of the thread since the coil turns engage the inclined flanks of the threads substantially at the pitch diameter of the thread as illustrated in FIG. 7.

While for any given thread 12, there is only one diameter wire for the coil 24 that precisely engages the flanks of two adjoining turns of the thread at the pitch diameter, wire of standard gauges is made in such a variety of sizes that it is possible to select a standard size which substantially fills this requirement. It will be appreciated that the diameter of the wire used for the coil is selected with regard to the shape and dimensions of the thread; and, consequently, changes with threads of different pitches and different shapes.

In case of a 60° V-thread, a turn of coil 24 is tangent at the intersection of the pitch diameter with two thread flanks, as in FIG. 7, for a particular wire diameter. This diameter can be calculated as the diameter of a circle circumscribed about an equilateral triangle having sides 26 equal to one-half the thread pitch. The closest standard wire size is ordinarily used.

Coil 24 is preferably made with as many turns or more than the number of turns of thread 12. This insures that all of the threads can be engaged by turns of the coil. The coil is also preferably provided with a tang 25 at one end or both ends, as may be desired. This tang may be grasped in order to facilitate removal of the coil from the bolt when the tang is on the leading end of the coil.

Since the outside diameter of coil 24 is greater than the major diameter of external thread 12, when the bolt with the concentricity coil applied to it is held in the jaws 28 of a chuck 30, as shown in FIG. 3, the jaws contact the outside surfaces of the coil and do not contact the crests of the thread. Coil 24 being made to the proper diameter, it slides along the thread flanks at the pitch diameter, and the gripping action of the chuck jaws merely presses the coil more tightly against the thread to hold bolt 10 firmly but without any appreciable deformation of the turns of coil 24.

The coil is preferably made of a hard, resilient ferrous metal, for example piano wire, in order that individual turns of the coil do not deform or compress under the gripping action of jaws 28.

A collet or chuck having three equally spaced jaws 28 grips the externally threaded bolt shank and the concentric coil thereon as illustrated in FIG. 5. The orientation of the bolt shank is thus determined solely by the contact with the coil along the cylindrical surface intersecting the threads and representing the pitch diameter of the threads. This insures that axis 15 is centrally located with respect to jaws 28 and any machining operations carried out while the bolt is held within the chuck 30 and then accurately referenced to axis 15 and are in no way determined by any contact with the crest of threads 12.

The foregoing description has been of a coil on an external thread 12. However, the invention may equally be applied to an internal thread, as thread 20 on nut 18. In this case, a different coil 32, having suitable dimensions selected with regard to thread 20, is placed on the internal threads, allowing the nut to be held by an expanding mandrel 33 held in jaws 28 of a chuck 34. The turns of the coil now extend inwardly beyond the minor diameter of the internal thread. Whether the thread is internal or external, the turns of the coil may be broadly described as projecting radially beyond the turns of the thread.

From the foregoing description, it will be apparent that various changes may occur to persons skilled in the art without departing from the spirit and scope of the present invention; and, accordingly, it is to be understood that the invention is not considered as being necessarily limited to the precise arrangement of the preferred embodiment described above.

I claim:

1. An apparatus for gripping a threaded fastening element which comprises:

a gripping tool, a helical coil of wire and a screw-threaded fastening element;

said screw-threaded fastening element being provided with turns having inclined flanks;

said helical coil of wire having a plurality of turns of uniform diameter lying between successive turns of the threads of the fastening element with the turns of the coil engaging the turns of the threads on the flanks substantially at the pitch diameter of the threaded element and with the outer surface of the coil turns projecting radially beyond the crests of the threads to provide collectively a cylindrical surface that is concentric with the threads and which is engaged by the gripping tool whereby the screw-threaded fastener element is gripped without damage to the threads;

said helical coil of wire being made from round hardened steel wire and having a wire diameter corresponding to the diameter of a circle circumscribed about an equilateral triangle having sides equal to one-half the pitch of the thread of the threaded fastening element; and said gripping tool including movable gripping jaw means in gripping engagement with the outer surface of the coil turns to prevent relative axial movement between the coil and the gripping means.

* * * * *